United States Patent [19]
Szczepanski et al.

[11] Patent Number: 5,340,479
[45] Date of Patent: Aug. 23, 1994

[54] DEPTH FILTER CARTRIDGE AND METHOD AND APPARATUS FOR MAKING SAME

[75] Inventors: Joseph T. Szczepanski, Waconia; Thomas M. Aune, Mound, both of Minn.; Henry J. Schneider, Chino, Calif.

[73] Assignee: Osmonics, Inc., Minnetonka, Minn.

[21] Appl. No.: 932,620

[22] Filed: Aug. 20, 1992

[51] Int. Cl.⁵ .............................................. B01D 27/07
[52] U.S. Cl. .................. 210/497.1; 210/505; 264/178 F
[58] Field of Search ............... 156/167, 441, 195, 443; 210/497.1, 505; 264/45.9, 173, 178 F, 209.1

[56] References Cited

U.S. PATENT DOCUMENTS 3,251,475  5/1966  Till et al. .................. 210/505 X

*Primary Examiner*—Frank Spear
*Attorney, Agent, or Firm*—Dorsey & Whitney

[57] ABSTRACT

A depth filter formed of a plurality of substantially continuous intertwined filaments including a central support zone formed of support filaments having a first diameter and a filter zone formed of filtration filaments having filaments of a second diameter in which the diameters are different or the filaments are constructed of different materials. The invention also relates to an apparatus and a method for making such a depth filter element.

40 Claims, 2 Drawing Sheets

DEPTH FILTER CARTRIDGE AND METHOD AND APPARATUS FOR MAKING SAME

BACKGROUND OF THE INVENTION

1. Field of the Invention

The present invention relates generally to the field of depth filters, and more particularly to a depth filter cartridge comprising a filter element constructed of a plurality of substantially continuous discrete filaments which are collected to form a generally tubular depth filter cartridge. The present invention also relates to a method and apparatus for making such a filter cartridge.

2. Description of the Prior Art

Several processes and apparatus for forming depth filters comprised of a plurality of substantially continuous filaments currently exist in the prior art. In this art, fiber forming devices or fiberizers are used to spray filaments of synthetic resinous material toward a rotating collection mandrel to be formed into a tubular configuration. During this process, jets of air or other gases act on the filaments to attenuate such filaments to a comparatively fine diameter and convey the same to the collection device. Several specific processes have evolved from this general concept.

One of these processes is described in U.S. Pat. No. 3,825,379 issued to Lohkamp et al. and U.S. Pat. No. 3,825,380 issued to Harding et al. Both disclose a process die or fiberizer consisting of a die head containing separate passages for the filament material and the attenuating air. During operation, molten resinous material fiber is forced through small holes in the die head toward a collection device and is attenuated by air streams positioned on opposite sides of the filament outlet holes. The collection methods utilized with this process include either a rotating drum such as shown in these patents to form a continuous mat or a rotating mandrel together with a press roller to form a tubular depth filter. This latter process is a non-continuous or semi-continuous process in which the diameters of the plurality of filaments is constant throughout the entirety of the element.

A second process is exemplified by U.S. Pat. No. 4,240,864 issued to Lin et al. This patent discloses a process die or nozzle block which delivers a plurality of filaments toward a rotating collection device. Associated with the filaments are attenuating air streams which function to attenuate the filaments as they travel toward the collection device. This patent also discloses a press roll for varying the pressure applied to the accumulating fibers on the rotating mandrel so as to provide a filter of varying fiber density. Like the process of Lohkamp et al. and Harding et al., the diameter of the individual filaments in this process is constant throughout the entirety of the filter element. However, contrary to Lohkamp et al. and Harding et al., this process is a continuous process in which the collected filaments are continuously forced off the rotating mandrel via the noncylindrical press roll to produce a coreless depth filter element.

A third specific process is represented by U.S. Pat. Nos. 4,594,202 and 4,726,901, both issued to Pall et al. Similar to the processes described above, the Pall process includes a fiberizer or fiberizer die having a plurality of individual nozzles through which the molten filament resin is forced toward a collection mandrel. Also similar to the other processes described above, this process discloses the use of air or gas streams for the purpose of attenuating the filaments as they travel toward the collection mandrel. This process differs from the processes described above, however, in that it discloses a means for varying the fiber diameter throughout the radial dimension of the filter element, while maintaining a substantially constant voids volume for each level of fiber diameter variance. Pall et al. accomplishes this by sequentially altering certain parameters which affect the fiber diameter during collection of the filaments on the rotating mandrel.

Although each of the above specific processes are generally acceptable for certain applications, each also has certain limitations. For example, one limitation of the Lohkamp et al. and Harding et al. process is that it is a non-continuous or semi-continuous process. In other words, a filter element of finite length is formed by building up a mat of attenuated filaments on a rotating mandrel. When the collected filament material reaches a desired thickness, the filter structure is removed and the process is commenced again for the next filter element. A further limitation is that the filament materials are dispensed from a common manifold. Thus, the characteristics of the collected filaments, including the filament diameters, are substantially identical throughout the entire radial thickness of the filter element. Still further, such process contemplates forming the filter structure on a separate core which remains part of the filter element when it is removed from the mandrel. If such a core is not used, a significant limitation exists in the fiber diameter which is needed to support the filter structure without collapse. This, in turn, necessarily limits the micron rating of the resulting filter, or the particle size which can be filtered.

The filter structure of Lin et al. is an improvement over the process of Lohkamp et al. and Harding et al. in that it is a continuous process for forming a continuous filter structure of indefinite length. However, Lin et al., like Lohkamp et al. and Harding et al. discloses a filter structure in which the filaments are all of the same diameter. Further, since the Lin process is designed for producing a coreless depth filter element (i.e.) a filter without a separate core, the central portion of the filter element must be formed from a filament having a diameter sufficiently large to provide support for the filter structure. This also, in turn, necessarily limits the micron rating of the filter or minimum particle size which can be filtered.

Although the Pall et al. patents contemplate a depth filter element comprised of filaments with varying diameters, there are several limitations which exist. First, the process of Pall et al. is not a continuous process, but must be repeated for each filter manufactured. Second, although some filter elements of Pall et al. have filaments of varying diameters, the process of making such elements has limitations. Specifically, the filament diameter is varied by sequentially changing one of several operating conditions of the filament producing mechanism. Whenever such a change is introduced, however, the system takes time to respond to such changes before again reaching equilibrium. The time frame for response is proportional to the degree of change. Because these changes are introduced during the manufacture of each individual filter element, a less stable and more variable process results. Further, the changeover from a filament of one diameter to that of another occurs gradually as a time related transition, rather than abruptly such as where the filaments are comprised of two or more discrete filaments.

Accordingly, although prior art methods exist for manufacturing depth filters, each of the methods, as well as the products constructed from such methods, have limitations which tend to limit the wide scale applicability of products produced by any one particular process. Accordingly, there is a need in the art for an improved, cost efficient coreless depth filter element, and more particularly, to a set of filter elements having a wide range of micron ratings and filtering applications. A need also exists for a continuous method and apparatus for producing such a filter.

SUMMARY OF THE INVENTION

In contrast to the prior art, the depth filter of the present invention is a coreless, non-woven depth filter element which is preferably manufactured on a continuous basis. Further, the filter element in accordance with the present invention is a graded fiber element which is provided with filaments of different diameters or filaments constructed of different materials. The filaments include support filaments at the central area of the filter with diameters which are sufficiently large to thermally bind into a structure which is strong enough to support the remainder of the filter structure without collapse. Such filter element is also provided with one or more layers of discrete filtration filaments of different diameters and preferably diameters smaller than the diameters of the support filaments. These filtration filaments define the ultimate filtration characteristics of the filter. Unlike prior art coreless structures, these filtration filament diameters can be quite small and significantly smaller than the filament diameters needed to support the central support portion of the filter element. The small filament diameter section or sections can then, if desired, be followed by one or more layers of a further varied filament diameter to act as a prefilter or the like to filter out larger particles. The filter element can also embody a graded density structure, if desired.

The apparatus for making such a filter includes two or more filament delivery systems spaced side-by-side in a direction parallel to the axial direction of the collection mandrel. These delivery systems are independently controlled so that filaments of different diameters or of different materials or polymers can simultaneously be produced and directed to a collection device and thus formed into a filter element. In the preferred embodiment of the present invention, the material feed passages are associated with positive displacement independent motor driven pumps in which the speed is independently and electronically controlled to thereby effect the material flow rate. The heating blocks for heating the material in the apparatus and maintaining it at a predetermined temperature are also independently heated and controlled by appropriate means as are the mechanisms for providing the attenuating gas.

The process of the present invention is a continuous process which includes providing two or more independently controlled filament dispensers or dispensing means and operating the dispensers simultaneously during the manufacture of a filter element to produce a depth filter having filaments of at least two different diameters or two different materials.

Accordingly, it is an object of the present invention to provide an improved coreless depth filter constructed of filaments having different diameters or filaments of different materials.

Another object of the present invention is to provide a set of coreless depth filter elements having an enhanced micron rating and thus the ability to filter a greater range of particle sizes.

Another object of the present invention is to provide a coreless depth filter having an innermost layer constructed of filaments of a first diameter and one or more outer, filter layers constructed of filaments of diameters less than the first diameter.

Another object of the present invention is to provide a depth filter having filaments of different diameters in which the specific filament diameters are selected to provide filter support as well as filtering capability.

A further object of the present invention is to provide a coreless depth filter constructed of filaments made from different materials.

A still further object of the present invention is to provide an improved method and apparatus for making a depth filter which includes at least two independently controlled filament producing means or dispensers functioning simultaneously to produce a continuous depth filter cartridge.

These and other objects of the present invention will become apparent with reference to the drawings, the description of the preferred and alternate embodiments and the appended claims.

DESCRIPTION OF THE PREFERRED EMBODIMENT AND METHOD

The present invention relates to an improved non-woven depth filter element, and more particularly a coreless depth filter element, as well as an apparatus and a method for making such element. Throughout the specification and claims the term "coreless" is used to describe certain depth filter elements. Unless otherwise indicated, the term "coreless" refers to a filter element which is not provided with a separate support core.

Figure 1:
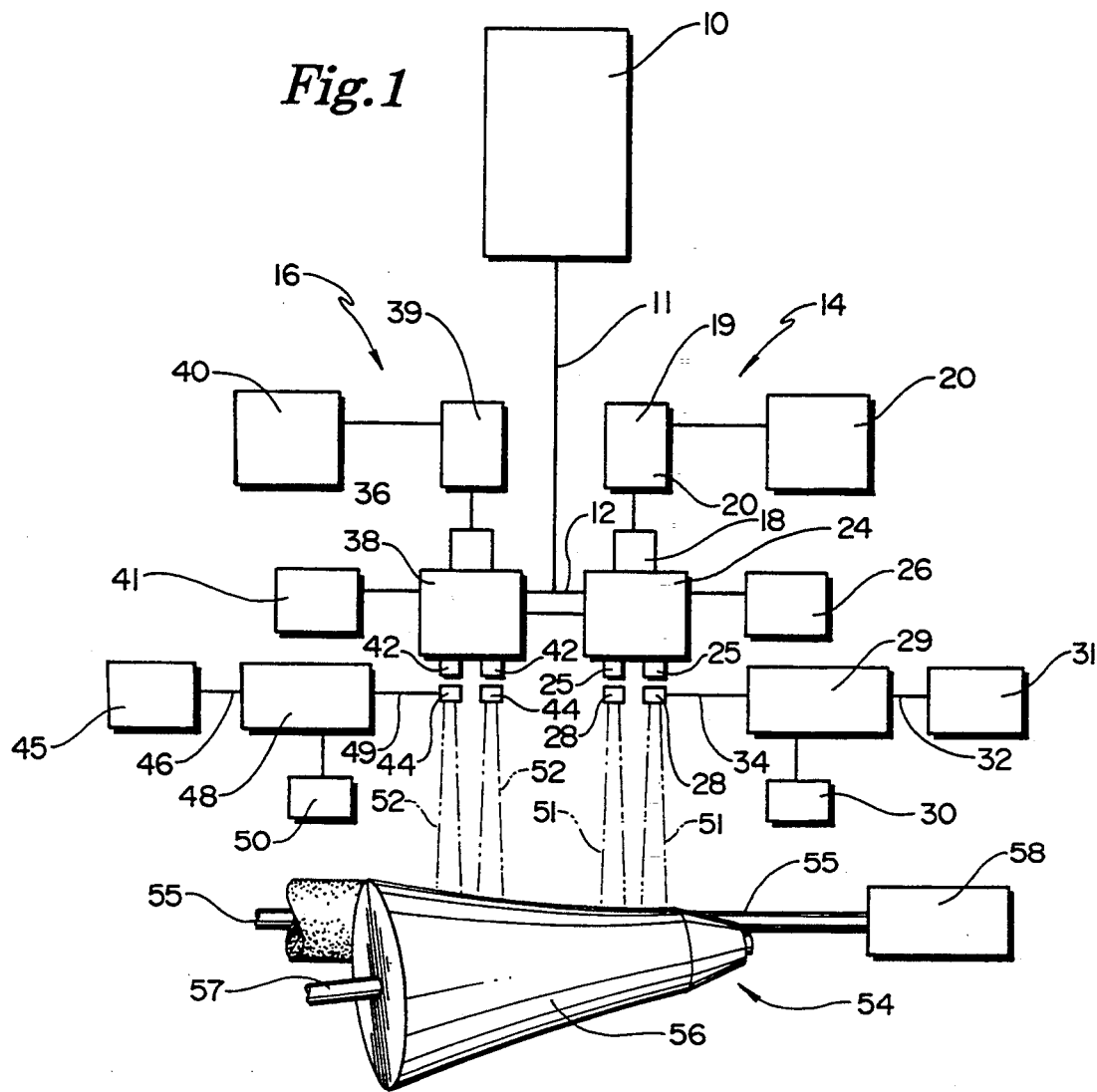
FIG. 1 is a schematic diagram illustrating the apparatus of the preferred embodiment of the present invention.

Reference is first made to FIG. 1 illustrating an apparatus which is used to continuously manufacture a depth filter element of indefinite length in which the depth filter is comprised of at least two discrete sets of thermally bound continuous filament material of different diameters or of different materials. The preferred embodiment of the apparatus includes a motor driven screw type extruder 10 which is supplied with thermo plastic polymeric material from a source (not shown). A single extruder 10 can function for both delivery systems as shown, or where filaments of different materials are contemplated, separate extruders can be provided for each delivery system. The particular thermo plastic polymeric material may be any one of a variety of synthetic resinous materials which can produce the filaments used in manufacturing the depth filter element of the present invention. Although the class of polymeric materials known as polypropylenes are preferred, polyesters, Nylon, polyurethanes and other materials may be used as well. Within the extruder 10, the polymeric material is heated to a molten state, at which time it is metered and conveyed into a heated delivery line 11. The material is maintained or further heated in the line 11 and is ultimately fed into a common manifold 12. The heated molten polymeric material is then directed by the manifold 12 to two substantially identical filament forming means in the form of two filament delivery systems which are illustrated by the general reference characters 14 and 16. Each of the delivery systems 14 and 16 is substantially identical and functions to produce one or more substantially continuous filaments of the resinous material and to direct the same along a predetermined path toward a collection means as will be described in greater detail below.

The filament delivery system 14 includes a motor driven gear type positive displacement metering pump 18 which receives molten polymeric material from the manifold 12 and directs it to the heater block 24. The speed of the motor 19 which drives the metering pump 18, and thus the rate at which the material is metered through the pump 18 is electronically controlled by an appropriate control means 20.

The block 24 is independently heated via heater means (not shown). Such heater means, and thus the temperature of the polymeric material within the block 24, is controlled by the temperature control means 26. The block 24 is provided with a plurality of filament dispensers or filament dispensing means in the form of a plurality of removable orifices 25, 25 and associated gas attenuating mechanisms 28, 28. The size of the orifices 25, 25 may be selected as desired to assist in achieving desired filament size or diameter. The molten material is fed to the nozzles 25, 25 through internal passages (not shown) within the block 24.

The filament attenuating mechanisms 28, 28 provide a plurality of gas or air jets to attenuate the filaments exiting from the nozzles 25 in a manner known in the art. The gas attenuating mechanisms 28, 28 accordingly may be of any design known in the art including that described in U.S. Pat. No. 4,173,443, the disclosure of which is incorporated herein by reference.

Each of the attenuation mechanisms 28, 28 is associated with a gas heater means 29 and gas supply 31. The attenuating gas is supplied from the supply 31 via the conduit 32 and appropriate valves and regulators to the heater 29 where its temperature is elevated or lowered to the desired temperature via the temperature control 30. The gas is then fed from the heater 29 through the conduit 34 to the attenuating means 28, 28. In the preferred embodiment of FIG. 1, the mechanisms 28, 28 are provided with attenuating gas from a common supply and control means. However, it is contemplated that each of the mechanisms 28, 28 could be provided with separately controlled gas sources such as that shown in FIG. 7.

The filament delivery system 16 is substantially identical to that of the system 14 described above. Specifically, the system 16 includes a heater head 38 corresponding to the head 24, an independently driven positive displacement metering pump 36 corresponding to the metering pump 18 and pump and pump control elements 39 and 40 corresponding to the elements 19 and 20. The head 38 is provided with a plurality of nozzles 42, 42 and temperature control means 41 corresponding to the nozzles 25, 25 and temperature control 26 of system 14. The system 16 is also provided with attenuating mechanisms 44, 44 associated with the nozzles 42, 42. The attenuating mechanisms 44, 44 are provided with attenuating air from an air supply 45 through a heater 48 similar to the air supply 31 and heater 29. Appropriate conduit means 46 and 49 and temperature control means 50 are also provided for the attenuating air in the filament producing means 16.

Figure 2:
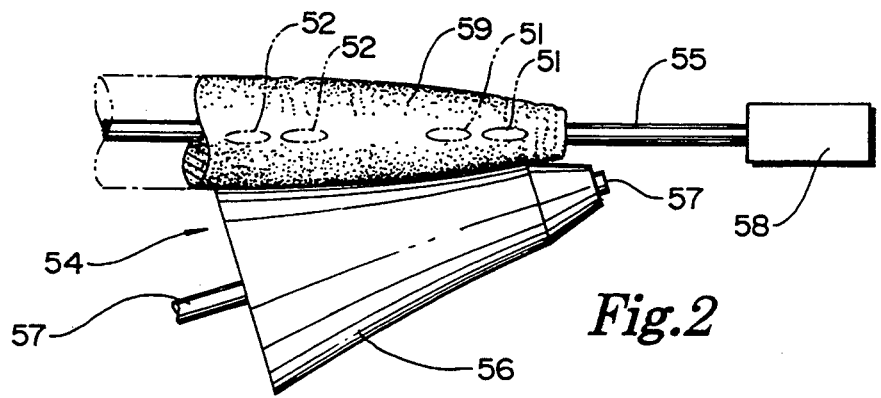
FIG. 2 is a plan view of the collection device as viewed from the source of the filaments.

Each of the delivery systems 14 and 16 is capable of producing a plurality of discrete, continuous filaments 51, 51 and 52, 52, respectively which are directed from the orifices 25, 25 and 42, 42 toward the filament collection means 54 illustrated in FIGS. 1 and 2. The collection means 54 includes a central, rotatable mandrel 55 supported for rotation via the rotation means 58. Adjacent to the mandrel 55 and spaced therefrom is a press roll member 56 rotatable about the axis 57. During operation, the plurality of filaments 51, 51 and 52, 52 are directed toward the rotating mandrel 55 and collected thereon in a manner known in the art. The rotating press roller 56 engages the filaments which have been wound onto the rotating mandrel 55. As sufficient filaments are built up on the mandrel 55, the press roller 56 forces the finished filter element 59 off the axial end of the mandrel 55 in the direction of the arrow 53 (FIG. 2) to produce a continuous filter element 59 of indefinite length. The entire collection means 54 is known to those skilled in the art and may be similar to that described in U.S. Pat. No. 4,240,864, the disclosure of which is incorporated herein by reference. In the preferred embodiment the press roller 56 is contoured, thus resulting in a filter element of graded density.

The preferred apparatus illustrated in FIG. 1 includes two independent filament delivery systems 14 and 16 capable of forming filaments of different diameters or different materials. Such an apparatus can be used to construct the filter element of FIG. 4 having filaments of different diameters or materials. It is contemplated, however, that the apparatus may embody a filament forming means embodying one or more additional independent filament delivery systems such as the system 15 illustrated schematically in FIG. 3. With the apparatus of FIG. 3, filaments of additional diameters or materials can be added to the filter element structure such as that shown in FIG. 6. The number of independent filament delivery systems in the apparatus is dictated by the particular filter element desired.

Figure 3:
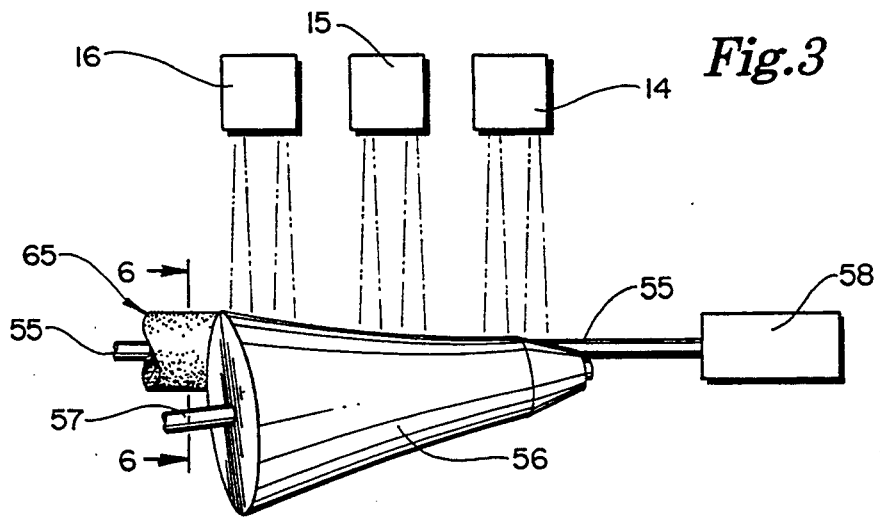
FIG. 3 is a schematic illustration of an alternate apparatus embodying more than two independent filament delivery systems.

With the apparatus of FIGS. 1-3, depth filter elements of the type contemplated by the present invention can be made. This is accomplished by altering or controlling certain structural components and/or operating conditions of each of the filament producing means 14 and 16 (FIG. 1) or 14, 15 and 16 (FIG. 3) to produce filaments having the desired filament diameters or other characteristics or filaments of different materials. For example, the filament size can be controlled to some extent by the orifice size. In general, the smaller the orifice, the smaller the filament diameter. The temperature of the filament material and the pressure at which it is forced through the orifice also has a bearing on filament size. In general, and within limits, higher temperatures and lower pressures will lead to smaller filament diameters. Further, the conditions of the attenuating gas, including the pressure, velocity and temperature of such gas, can be used to control filament size and characteristics. Generally, increased pressure, velocity and temperature of the attenuating gas will result in smaller filament diameter.

Figure 7:
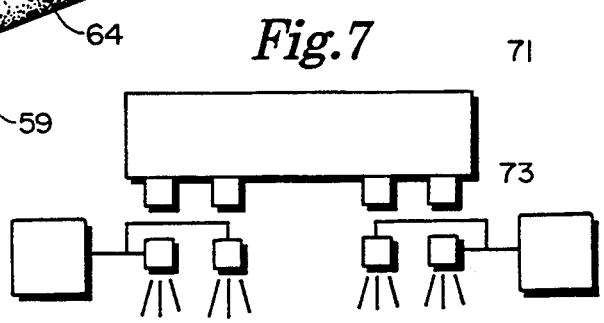
FIG. 7 is a schematic illustration of a further embodiment of the present invention showing a single material delivery system with two independently controlled filament dispensing means.

It should also be noted that certain of the structural components or operating conditions within each of the filament producing means 14, 15 or 16 can also be controlled. For example, the size of the orifices 25, 25 can be adjusted to produce filaments of different sizes from the means 14. Similarly, as shown in FIG. 7, it is contemplated that one or more of the filament delivery systems such as the system of FIG. 7 can be provided with one or more individual attenuating gas supply and control means 72 and 73. Each of these means 72 and 73 is associated with one or more of the gas attenuating mechanisms to individually control the size and characteristics of the resulting filaments.

Figure 4:
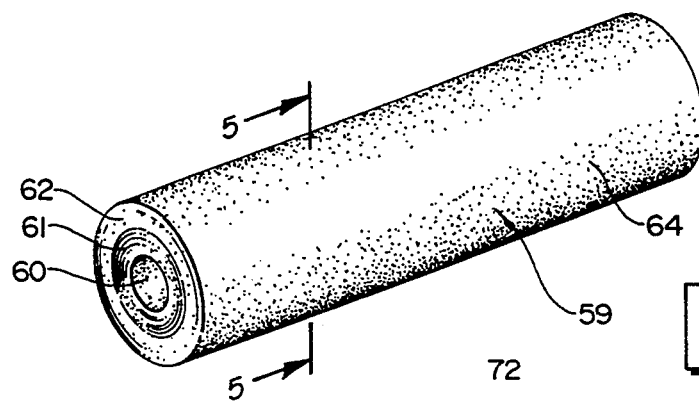
FIG. 4 is a pictorial view of a depth filter element in accordance with the present invention which has been made via the method and apparatus of the present invention, and in particular, an apparatus such as that of FIG. 1.
Figure 5:
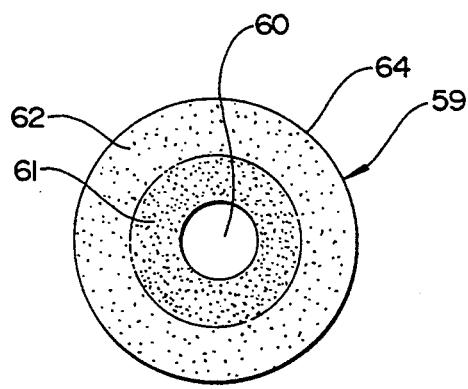
FIG. 5 is a sectional view as viewed along the section line 5—5 of FIG. 4.

The depth filter element 59 illustrated pictorially in FIG. 4 and sectionally in FIG. 5 is a generally elongated depth filter element which is coreless and which can be constructed of indefinite length via the continuous process of the present invention. The coreless nature of the filter element 59 is due to the fact that as the filter is forced off the rotating mandrel 55 by the press roll 56, the center hollow portion 60 of the filament 59 is defined by the inner surface of the innermost portion 61 of intertwined filaments of resinous material. This is in contrast to a filter element in which the intertwined filaments are supported by a separate, hollow support core constructed of plastic or the like.

In the preferred embodiment, the filter element 59 is an elongated generally tubular element of indefinite length having a generally tubular hollow interior 60 and a generally cylindrical external surface 64. The preferred element 59 of FIGS. 4 and 5 also includes a filter portion comprised of a plurality of substantially continuous, thermally bound, intertwined filaments of synthetic resinous material. This filter portion includes a central support zone 61 comprised of a plurality of support zone filaments having a first diameter and a filtering zone 62 comprised of one or more filtering levels, each comprised of a plurality of filtration filaments having a second or more diameters different than the diameter of the support zone filaments. In the embodiment of FIGS. 4 and 5, the filtering zone 62 is comprised of a single filtering level.

The support zone filaments of FIGS. 4 and 5 have a diameter which is sufficiently large to provide support for the filter element during the filtering process, and in particular, support for the filtering zone filaments. The support zone filaments should also be of a size that facilitates the thermal bondings of such filaments to one another. Preferably the diameter of such support filaments should be greater than about 15 microns and between about 15–50 microns. Most preferably such diameters should be about 20–40 microns. The filtering zone of the element 59 of FIGS. 4 and 5 is comprised of a single filtering level identified by the reference numeral 62. The filtering zone filaments of this level 62 have a diameter which is dictated by the desired filtering characteristics of the filter element 59. Although these filtration filaments can be of any desired diameter, the preferred embodiment contemplates that they will be smaller than the support filaments forming the support zone 61 and generally in the range of about 1 to 15 microns. More preferably such filaments will have a diameter in the range of about 1–8 microns. With filtration filament diameters in this range, a coreless depth filter can be constructed which is capable of filtering particles much smaller than prior art coreless depth filters. In addition to the variance in filament diameter, the density of such filaments in the filter element can also be varied in accordance with the prior art via the press roller as taught in U.S. Pat. No. 4,240,864.

Figure 6:
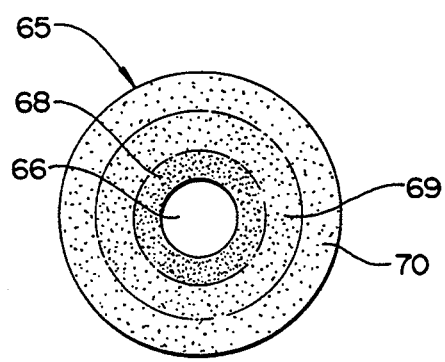
FIG. 6 is a sectional view similar to FIG. 5 of an alternate depth filter embodiment constructed in accordance with the present invention, and in particular from an apparatus such as that of FIG. 3.

A modified depth filter construction 65 is illustrated in FIG. 6. This construction 65 differs from that illustrated in FIGS. 4 and 5 by the number of layers or levels in the filtering zone. Specifically, the embodiment of FIG. 6 is constructed using an apparatus such as that of FIG. 3. The element 65 includes a hollow center 66, a central support zone comprised of the layer 68 and a filtering zone comprised of the two filtering layers 69 and 70. Each of the layers 68, 69 and 70 is constructed of a plurality of discrete resinous filaments with differing diameters. Similar to the support layer 61 of the embodiment of FIGS. 4 and 5, the support zone filaments of the layer 68 have a diameter sufficiently large to support the filtering zone filaments and thus preferably have a diameter greater than about 15 microns or about 15–50 microns, and most preferably, a diameter of about 20–40 microns.

Also, similar to the filtering zone 62 of FIGS. 4 and 5, the diameter of the filtration filaments forming the layers 69 and 70 is generally smaller than the filaments of the support zone layer 68. Preferably, the filtration filaments of the filter layer 69 have a diameter of approximately 1–15 microns, while the filtration filaments of the filter layer 70 have a diameter of approximately 3–10 microns larger to serve as a prefilter layer for the filter layer 69.

In addition to a coreless depth filter element having filaments of different diameters, the filaments can also be constructed of different materials. For example, filaments of a first material such as a polypropylene or polyethylene could be used to form the support zone 61 (FIGS. 4 and 5) or 68 (FIG. 6), while filaments of a second or third material, such as a Nylon or a polyester could be used to form the filter layers 62 (FIGS. 4 and 5) or 69, 70 (FIG. 6).

It should be noted that the filament forming means contemplated by the present invention is not capable of producing filaments of an exact and constant diameter. For example, during the production of filaments having diameters of about 15 microns, some will be larger, while some will be smaller. Most, however, will be about 15 microns. The same is true for the ranges of filament sizes set forth above and in the claims.

Having described the apparatus of the present invention and the structure of the depth filter element in detail, the general operation of the apparatus and the method of the present invention can be best understood as follows.

First, molten resinous material is supplied to the extruder 10 of FIG. 1 where it is heated to a desired temperature. This material is then conveyed to the manifold 12 where it is directed to each of the filament delivery systems 14 and 16. With this structure, the material which is fed to the systems 14 is the same as that which is fed to the system 16. Thus, the material forming the filaments 51, 51 and 52, 52 is the same. It is contemplated, however, that if desired, the filaments 51, 51 and 52, 52 can be made from different materials, such as one from a polypropylene and a second from a polyester or other polymer. In such a case, a separate extruder 10 would be provided for each system 14 and 16.

The apparatus of FIG. 1 is designed to produce filaments 51, 51 and 52, 52 having two different diameters or of two different materials. Thus, the apparatus of FIG. 1 may be used to make the depth filter element illustrated in FIGS. 4 and 5. To produce a depth filter element as illustrated in FIG. 6 having more than two layers of filaments with different diameters or constructed from filaments of more than two different materials, a third independent filament delivery system 15 such as shown in FIG. 3 is employed. This third filament producing means 15 can also be served by a common extruder similar to the extruder 10, or can be provided with its own separate corresponding extruder.

Because of the fact that the filament delivery systems 14 and 16 of FIG. 1 or 14, 15 and 16 of FIG. 3 are independently controlled, the various factors affecting filament size, including temperature, orifice size, pressure, resin throughput rate, attenuating gas conditions, etc. can be set and controlled to produce filaments having desired diameters to function either as support filaments for a coreless depth filter or as filtration or prefiltration filaments for the filtering levels.

In constructing the depth filter of the present invention, the filaments 51, 51 and 52, 52 (FIG. 1) are directed toward the rotating mandrel 55 such that they accumulate on the mandrel. It should be noted that the filaments 51, 51 and 52, 52 are directed toward the mandrel 55 along its axial length. With the press roll 56 in the position illustrated in FIGS. 1 and 2, the filaments 51, 51 would normally be the coarser filaments or those with a greater diameter sufficient to form the support portion of the filter element 59. As the filter element is moved axially along the rotating mandrel 55 by the press roll 56 in the direction 57 (FIG. 2), the filaments 52, 52 are laid and collected on top of the previously collected filaments 51, 51, thereby forming the outer or filtering layer. If other filaments of further differing diameters or materials are desired, the filament dispensing means for dispensing such filaments can be added axially next to the dispenser forming the filaments 52, 52.

Although the description of the preferred embodiment and method has been quite specific, it is contemplated that various modifications could be made without deviating from the spirit of the present invention. Accordingly, it is intended that the scope of the present invention be dictated by the appended claims rather than by the description of the preferred embodiment.

We claim:

1. A non-woven, continuously formed depth filter element of indefinite length comprising:
a generally tubular member having a hollow interior extending in an axial direction throughout the length of said member and a filter portion, said filter portion including a central support zone and a filtering zone, said central support zone having an interior surface defining said hollow interior and comprised of a plurality of substantially continuous interwined and thermally bound support zone filaments of synthetic resinous material having a diameter sufficiently large to provide support for said filtering zone, said filtering zone positioned radially outward of said central support zone and comprised of at least one filtering level constructed of a plurality of substantially continuous intertwined filtration zone filaments, said support zone filaments and said filtration filaments being discrete relative to one another and being of different diameters or different materials.

2. The filter element of claim 1 being coreless.

3. The filter element of claim 2 wherein said support zone filaments have a diameter of at least 15 microns.

4. The filter element of claim 3 wherein said support zone filaments are thermally bound and have a diameter of about 15 to 50 microns.

5. The filter element of claim 1 wherein said one filtering level is constructed of filtration filaments having a diameter less than the diameter of said support zone filaments.

6. The filter element of claim 1 having first and second filtering levels wherein said first filtering level is positioned immediately radially outward of said central support zone and is comprised of first filtration filaments having a first diameter and wherein said second filtering level is positioned radially outward of said first filtering level and is comprised of second filtration filaments having a second diameter greater than said first diameter.

7. The filter element of claim 6 wherein said first diameter is less than the diameter of said support zone filaments.

8. The filter element of claim 1 wherein said filtration filaments have a diameter of about 1 to 15 microns.

9. The filter element of claim 1 being of graded density.

10. The depth element of claim 1 wherein said tubular member includes a tubular outer surface and said filter portion has a radial dimension extending from said hollow interior to said tubular outer surface, said filter portion further including a plurality of radial positions each defined by all points within said filter portion at a constant radial dimension, and wherein the filter characteristics of said filter portion at any one radial position are substantially identical throughout the entirety of said filter portion.

11. The depth filter of claim 1 wherein said filtration zone filaments are thermally bound.

12. An apparatus for making a continuous, nonwoven, generally tubular, depth filter element comprising:
first filament forming means for producing a first substantially continuous molten filament of synthetic resinous material having a first diameter, for attenuating said first filament and for conveying said first filament in a stream along a first predetermined path, said first filament forming means including a first filament delivery system;
second filament forming means for simultaneously producing a second substantially continuous molten filament of synthetic resinous material having a second diameter, for attenuating said second filament and for conveying said second filament in a stream along a second predetermined path, said second filament forming means including a second filament delivery system, said first and second filament forming means producing discrete filaments and said first and second filament delivery system being independently controlled;
a collection means positioned in said first and second predetermined paths, said collection means including a rotating mandrel operable to receive said first and second filaments for continuously forming the filter element, said mandrel having an axial length and an outer collection surface.

13. The apparatus of claim 12 wherein said first and second filament delivery systems respectively include independently controlled first and second resinous material pumps.

14. The apparatus of claim 12 wherein said first and second delivery systems include means for independently controlling the throughput of resinous material.

15. The apparatus of claim 12 wherein said first and second filament forming means are spaced from one another in a direction generally parallel to the axial length of said mandrel.

16. The apparatus of claim 12 wherein said first and second filament forming means are independently controlled.

17. The apparatus of claim 12 wherein said first and second filament forming means is comprised of first and second filament dispensing means.

18. The apparatus of claim 17 wherein said first and second filament dispensing means includes first and second, independently controlled gas attenuating means.

19. The apparatus of claim 18 wherein said first and second gas attenuating means is provided on a common filament delivery system.

20. The apparatus of claim 12 including press roll means operable with said mandrel to urge the collected filaments axially off said mandrel to produce a depth filter element of indefinite length.

21. The apparatus of claim 12 wherein said first filament forming means is positioned so that said first filaments are collected on said mandrel immediately radially outward of said outer collection surface.

22. The apparatus of claim 21 wherein said second filament forming means is positioned so that said second filaments are collected on said mandrel immediately radially outward of said first filaments.

23. The apparatus of claim 22 wherein said first diameter is at least about 15 microns.

24. The apparatus of claim 22 wherein said second diameter is less than said first diameter.

25. The apparatus of claim 12 having at least one additional filament forming means for producing an additional substantially continuous filament of synthetic resinous material having an additional diameter for attenuating said additional filament and for conveying said additional filament in a stream along an additional predetermined path.

26. The apparatus of claim 12 wherein said first and second diameters are different.

27. The apparatus of claim 12 wherein said first and second filaments are constructed of different materials.

28. The apparatus of claim 13 wherein said first and second delivery systems include means for independently controlling the temperature of said resinous material.

29. The apparatus of claim 12 including means for continuously causing a portion of said filter element to be removed from said rotating mandrel.

30. A continuous process of making a non-woven, generally tubular depth filter element comprising the steps of:

simultaneously producing first and second substantially continuous, but discrete molten filaments of synthetic resinous material by providing first and second filament delivery systems and independently controlling said first and second filament delivery systems and conveying said first and second filaments in streams along first and second predetermined paths toward a collection means, respectively, said first and second filaments having first and second diameters, respectively;

collecting said first and second filaments on said collection means with rotating mandrel with an axial length and an outer collection surface.

31. The method of claim 30 wherein said first filaments are collected on said mandrel immediately radially outward of said outer collection surface and said second filaments are collected on said mandrel immediately radially outward of said first filaments.

32. The method of claim 31 wherein said first diameter is greater than said second diameter.

33. The method of claim 32 wherein said first diameter is at least about 15 microns and said second diameter is less than about 15 microns.

34. The method of claim 33 wherein said second diameter is about 1 to 15 microns.

35. The method of claim 30 wherein said first and second filaments are constructed of different materials.

36. The method of claim 30 wherein said first and second diameters are different.

37. The method of claim 30 wherein said step of simultaneously producing first and second filaments includes providing first and second filament delivery systems and independently controlling said first and second delivery systems.

38. The method of claim 30 wherein said step of simultaneously producing first and second filaments includes providing first and second filament dispensing means and independently controlling said first and second filament dispensing means.

39. The method of claim 38 including independently controlling the attenuation of said filaments.

40. The method of claim 30 including continuously removing said filter element from said rotating mandrel.

* * * * *